US010942892B2

(12) United States Patent
Driesen et al.

(10) Patent No.: US 10,942,892 B2
(45) Date of Patent: Mar. 9, 2021

(54) TRANSPORT HANDLING OF FOREIGN KEY CHECKS

(71) Applicant: SAP SE, Walldorf (DE)

(72) Inventors: Volker Driesen, Heidelberg (DE); Wulf Kruempelmann, Altlussheim (DE)

(73) Assignee: SAP SE, Walldorf (DE)

( * ) Notice: Subject to any disclaimer, the term of this patent is extended or adjusted under 35 U.S.C. 154(b) by 286 days.

(21) Appl. No.: 15/983,469

(22) Filed: May 18, 2018

(65) Prior Publication Data
US 2019/0354600 A1 Nov. 21, 2019

(51) Int. Cl.
G06F 16/11 (2019.01)
(52) U.S. Cl.
CPC ................... G06F 16/119 (2019.01)
(58) Field of Classification Search
CPC ...... G06F 16/13; G06F 16/174; G06F 16/275; G06F 16/178; G06F 16/1734; G06F 16/219; G06F 16/119
USPC ...................... 707/999.2, 821, 610, 741, 822
See application file for complete search history.

(56) References Cited

U.S. PATENT DOCUMENTS

| | | | |
|---|---|---|---|
| 6,151,608 A * | 11/2000 | Abrams | G06F 16/214 707/679 |
| 7,191,160 B2 | 3/2007 | Hoeft et al. | |
| 7,302,678 B2 | 11/2007 | Bohlmann et al. | |
| 7,325,233 B2 | 1/2008 | Kuck et al. | |
| 7,392,236 B2 | 6/2008 | Rusch et al. | |
| 7,421,437 B2 | 9/2008 | Hoeft et al. | |
| 7,457,828 B2 | 11/2008 | Wenner et al. | |
| 7,461,097 B2 | 12/2008 | Stahl et al. | |
| 7,480,681 B2 | 1/2009 | Fecht et al. | |
| 7,490,102 B2 | 2/2009 | Ivanova et al. | |
| 7,519,614 B2 | 4/2009 | Glania et al. | |
| 7,523,142 B2 | 4/2009 | Driesen et al. | |
| 7,565,443 B2 | 7/2009 | Rossmanith et al. | |
| 7,571,164 B2 | 8/2009 | Kuersch et al. | |
| 7,587,705 B2 | 9/2009 | Benjes et al. | |
| 7,631,303 B2 | 12/2009 | Debertin et al. | |
| 7,634,771 B2 | 12/2009 | Benjes et al. | |

(Continued)

OTHER PUBLICATIONS

U.S. Appl. No. 14/960,983, filed Dec. 7, 2015, Eberlein, et al.

(Continued)

Primary Examiner — Robert W Beausoliel, Jr.
Assistant Examiner — Pedro J Santos
(74) Attorney, Agent, or Firm — Fish & Richardson P.C.

(57) ABSTRACT

Implementations can include actions of, prior to executing a transport between a first and a second database system, receiving a set of records, and, for a first record: identifying a first table of the first database system that the first record is stored in, and determining that the first table is associated with a set of foreign key constraints (FKCs), and, for each FKC: determining that a referenced record exists based on a FKC, the FKC relating the first record in the first table to the referenced record in a second table, and selectively adding the referenced record to a list of the transport to maintain validity of the FKC within the second database system after execution of the transport, and providing the transport including the list, the transport being executable in the second database system to one or more of add records and delete records.

20 Claims, 6 Drawing Sheets

(56) References Cited

U.S. PATENT DOCUMENTS

| | | | |
|---|---|---|---|
| 7,647,251 B2 | 1/2010 | Baeuerle et al. |
| 7,650,597 B2 | 1/2010 | Bohlmann et al. |
| 7,657,575 B2 | 2/2010 | Eberlein et al. |
| 7,669,181 B2 | 2/2010 | Benjes et al. |
| 7,702,696 B2 | 4/2010 | Ziegler et al. |
| 7,720,992 B2 | 5/2010 | Brendle et al. |
| 7,734,648 B2 | 6/2010 | Eberlein |
| 7,739,387 B2 | 6/2010 | Eberlein et al. |
| 7,774,319 B2 | 8/2010 | Schweigkoffer et al. |
| 7,788,319 B2 | 8/2010 | Schmidt et al. |
| 7,797,708 B2 | 9/2010 | Weber et al. |
| 7,844,659 B2 | 11/2010 | Baeuerle et al. |
| 7,894,602 B2 | 2/2011 | Mueller et al. |
| 7,934,219 B2 | 4/2011 | Baeuerle et al. |
| 7,962,920 B2 | 6/2011 | Gabriel et al. |
| 7,971,209 B2 | 6/2011 | Eberlein et al. |
| 8,005,779 B2 | 8/2011 | Baeuerle et al. |
| 8,108,433 B2 | 1/2012 | Baeuerle et al. |
| 8,108,434 B2 | 1/2012 | Schlarb et al. |
| 8,126,919 B2 | 2/2012 | Eberlein |
| 8,200,634 B2 | 6/2012 | Driesen et al. |
| 8,225,303 B2 | 7/2012 | Wagner et al. |
| 8,250,135 B2 | 8/2012 | Driesen et al. |
| 8,291,038 B2 | 10/2012 | Driesen |
| 8,301,610 B2 | 10/2012 | Driesen et al. |
| 8,315,988 B2 | 11/2012 | Glania et al. |
| 8,356,010 B2 | 1/2013 | Driesen |
| 8,356,056 B2 | 1/2013 | Schlarb et al. |
| 8,375,130 B2 | 2/2013 | Eberlein et al. |
| 8,380,667 B2 | 2/2013 | Driesen |
| 8,392,573 B2 | 3/2013 | Lehr et al. |
| 8,402,086 B2 | 3/2013 | Driesen et al. |
| 8,407,297 B2 | 3/2013 | Schmidt-Karaca et al. |
| 8,413,150 B2 | 4/2013 | Lu et al. |
| 8,429,668 B2 | 4/2013 | Kowalkiewicz et al. |
| 8,434,060 B2 | 4/2013 | Driesen et al. |
| 8,467,817 B2 | 6/2013 | Said et al. |
| 8,473,942 B2 | 6/2013 | Heidel et al. |
| 8,479,187 B2 | 7/2013 | Driesen et al. |
| 8,484,167 B2 | 7/2013 | Glania et al. |
| 8,489,640 B2 | 7/2013 | Schlarb et al. |
| 8,504,980 B1 | 8/2013 | Kraft et al. |
| 8,555,249 B2 | 10/2013 | Demant et al. |
| 8,560,876 B2 | 10/2013 | Driesen et al. |
| 8,566,784 B2 | 10/2013 | Driesen et al. |
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,612,927 B2 | 12/2013 | Brunswig et al. |
| 8,645,483 B2 | 2/2014 | Odenheimer et al. |
| 8,683,436 B2 | 3/2014 | Baeuerle et al. |
| 8,694,557 B2 | 4/2014 | Thimmel et al. |
| 8,706,772 B2 | 4/2014 | Hartig et al. |
| 8,719,826 B2 | 5/2014 | Baeuerle et al. |
| 8,751,437 B2 | 6/2014 | Teichmann et al. |
| 8,751,573 B2 | 6/2014 | Said et al. |
| 8,762,408 B2 | 6/2014 | Brand et al. |
| 8,762,731 B2 | 6/2014 | Engler et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,819,075 B2 | 8/2014 | Schlarb et al. |
| 8,856,727 B2 | 10/2014 | Schlarb et al. |
| 8,863,005 B2 | 10/2014 | Lehr et al. |
| 8,863,097 B2 | 10/2014 | Thimmel et al. |
| 8,868,582 B2 | 10/2014 | Fitzer et al. |
| 8,880,486 B2 | 11/2014 | Driesen et al. |
| 8,886,596 B2 | 11/2014 | Effern et al. |
| 8,892,667 B2 | 11/2014 | Brunswig et al. |
| 8,924,384 B2 | 12/2014 | Driesen et al. |
| 8,924,565 B2 | 12/2014 | Lehr et al. |
| 8,938,645 B2 | 1/2015 | Schlarb et al. |
| 8,949,789 B2 | 2/2015 | Schlarb et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,009,708 B2 | 4/2015 | Lu et al. |
| 9,020,881 B2 | 4/2015 | Ritter et al. |
| 9,021,392 B2 | 4/2015 | Baeuerle et al. |
| 9,026,502 B2 | 5/2015 | Driesen et al. |
| 9,026,857 B2 | 5/2015 | Becker et al. |
| 9,031,910 B2 | 5/2015 | Driesen |
| 9,032,406 B2 | 5/2015 | Eberlein |
| 9,038,021 B2 | 5/2015 | Schlarb et al. |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,176,801 B2 | 11/2015 | Baeuerle et al. |
| 9,182,979 B2 | 11/2015 | Odenheimer et al. |
| 9,182,994 B2 | 11/2015 | Schlarb et al. |
| 9,183,540 B2 | 11/2015 | Eberlein et al. |
| 9,189,226 B2 | 11/2015 | Driesen et al. |
| 9,189,520 B2 | 11/2015 | May et al. |
| 9,223,985 B2 | 12/2015 | Eberlein et al. |
| 9,229,707 B2 | 1/2016 | Borissov et al. |
| 9,244,697 B2 | 1/2016 | Schlarb et al. |
| 9,251,183 B2 | 2/2016 | Mandelstein et al. |
| 9,256,840 B2 | 2/2016 | Said et al. |
| 9,262,763 B2 | 2/2016 | Peter et al. |
| 9,274,757 B2 | 3/2016 | Said et al. |
| 9,354,948 B2 | 5/2016 | Baeuerle et al. |
| 9,275,120 B2 | 6/2016 | Mayer et al. |
| 9,361,407 B2 | 6/2016 | Hutzel et al. |
| 9,378,233 B2 | 6/2016 | Lee et al. |
| 9,430,523 B2 | 8/2016 | Falter et al. |
| 9,442,977 B2 | 9/2016 | Falter et al. |
| 9,507,810 B2 | 11/2016 | Baeuerle et al. |
| 9,513,811 B2 | 12/2016 | Wein et al. |
| 9,575,819 B2 | 2/2017 | Baeuerle et al. |
| 9,619,552 B2 | 4/2017 | Falter et al. |
| 9,639,567 B2 | 5/2017 | Lee et al. |
| 9,639,572 B2 | 5/2017 | Hutzel et al. |
| 9,724,757 B2 | 8/2017 | Barrett |
| 10,740,286 B1 * | 8/2020 | Gilderman ............ G06F 9/5038 |
| 2005/0052150 A1 | 3/2005 | Bender |
| 2006/0248507 A1 | 11/2006 | Benjes et al. |
| 2006/0248545 A1 | 11/2006 | Benjes et al. |
| 2008/0120129 A1 | 5/2008 | Seubert et al. |
| 2009/0313309 A1 * | 12/2009 | Becker ................ G06F 16/13 |
| 2010/0070336 A1 | 3/2010 | Koegler et al. |
| 2010/0153341 A1 | 6/2010 | Driesen et al. |
| 2010/0161648 A1 | 6/2010 | Eberlein et al. |
| 2010/0228764 A1 * | 9/2010 | Sallakonda ....... G06F 16/24565 |
| | | 707/769 |
| 2013/0132349 A1 | 5/2013 | Hahn et al. |
| 2013/0325672 A1 | 12/2013 | Odenheimer et al. |
| 2013/0332424 A1 | 12/2013 | Nos et al. |
| 2014/0040294 A1 | 2/2014 | An et al. |
| 2014/0047319 A1 | 2/2014 | Eberlein |
| 2014/0101099 A1 | 4/2014 | Driesen et al. |
| 2014/0108440 A1 | 4/2014 | Nos |
| 2014/0164963 A1 | 6/2014 | Klemenz et al. |
| 2014/0324917 A1 | 10/2014 | Haas et al. |
| 2014/0325069 A1 | 10/2014 | Odenheimer et al. |
| 2014/0359594 A1 | 12/2014 | Erbe et al. |
| 2014/0379677 A1 | 12/2014 | Driesen et al. |
| 2015/0006608 A1 | 1/2015 | Eberlein et al. |
| 2015/0046413 A1 | 2/2015 | Mihnea et al. |
| 2015/0100546 A1 | 4/2015 | Eberlein et al. |
| 2015/0178332 A1 | 6/2015 | Said et al. |
| 2015/0347410 A1 | 12/2015 | Kim et al. |
| 2017/0025441 A1 | 1/2017 | Mori |

OTHER PUBLICATIONS

U.S. Appl. No. 15/083,918, filed Mar. 29, 2016, Eberlein, et al.
U.S. Appl. No. 15/087,677, filed Mar. 31, 2016, Eberlein, et al.

(56) References Cited

OTHER PUBLICATIONS

U.S. Appl. No. 15/285,715, filed Oct. 5, 2016, Specht et al.
U.S. Appl. No. 15/593,830, filed May 12, 2017, Eberlein, et al.

* cited by examiner

TRANSPORT HANDLING OF FOREIGN KEY CHECKS

BACKGROUND

Enterprise systems can include systems that execute applications on, and access data stored in an underlying database system. In some instances, multiple systems can be provided, and data can be transported between systems. For example, a database can be populated with content (e.g., data stored in a table) in a first system (e.g., a quality system), and can be transported to a second system (e.g., a production system). The data can include, for example, configuration data, and/or master data among other types of data.

In some instances, the process of transporting the data is executed by creating a list of table keys, which are read from the first system, and are written to a file for deployment to the second system. In some instances, one or more constraints are defined between tables. An example constraint can include a foreign key constraint (FKC) that is defined between two tables, and is used by applications accessing the data. However, the FKCs are not created as database artifacts, and a higher layer of software is used to ensure the FKCs are met.

SUMMARY

Implementations of the present disclosure include computer-implemented methods for ensuring foreign key constraints (FKCs) between data tables in data transport between database systems. More particularly, implementations of the present disclosure are directed to processing records that are to be added, or deleted as a result of a transport between database system, prior to execution of the transport. In some implementations, actions include, prior to executing a transport between the first database system, and the second database system, receiving a set of records, and, for a first record in the set of records: identifying a first table of the first database system that the at least one record is stored in, and determining that the first table is associated with a set of foreign key constraints (FKCs), and, for each FKC: determining that a referenced record exists based on a FKC, the FKC relating the first record in the first table to the referenced record in a second table within the first database system, and selectively adding the referenced record to a list of the transport to maintain validity of the FKC within the second database system after execution of the transport, and providing the transport including the list, the transport being executable in the second database system to one or more of add records and delete records, while maintaining validity of one or more FKCs in the second database system. Other implementations of this aspect include corresponding systems, apparatus, and computer programs, configured to perform the actions of the methods, encoded on computer storage devices.

These and other implementations can each optionally include one or more of the following features: the referenced record is to be added to the second database system as a result of the transport; selectively adding the referenced record to the list at least partially includes determining that referenced record is included in the first database system, and that the referenced record has not been previously exported to the second database system, and is not listed for deletion on the transport being assembled; selectively adding the referenced record to the list at least partially includes determining that the referenced record is not provided as default content; the referenced record is to be deleted from the second database system as a result of the transport; selectively adding the referenced record to the list at least partially includes determining that referenced record is included in the first database system; and actions further include adding a second referenced record to the list, the second referenced record being referenced by the referenced record through a second FKC.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure include computer-implemented methods for ensuring foreign key constraints (FKCs) between data tables in data transport between database systems. More particularly, implementations of the present disclosure are directed to processing records that are to be added, or deleted as a result of a transport between database system, prior to execution of the transport. Implementations can include actions of, prior to executing a transport between the first database system, and the second database system, receiving a set of records, and, for a first record in the set of records: identifying a first table of the first database system that the at least one record is stored in, and determining that the first table is associated with a set of foreign key constraints (FKCs), and, for each FKC: determining that a referenced record exists based on a FKC, the FKC relating the first record in the first table to the referenced record in a second table within the first database system, and selectively adding the referenced record to a list of the transport to maintain validity of the FKC within the second database system after execution of the transport, and providing the transport including the list, the transport being executable in the second database system to one or more of add records and delete records, while maintaining validity of one or more FKCs in the second database system.

Figure 1:
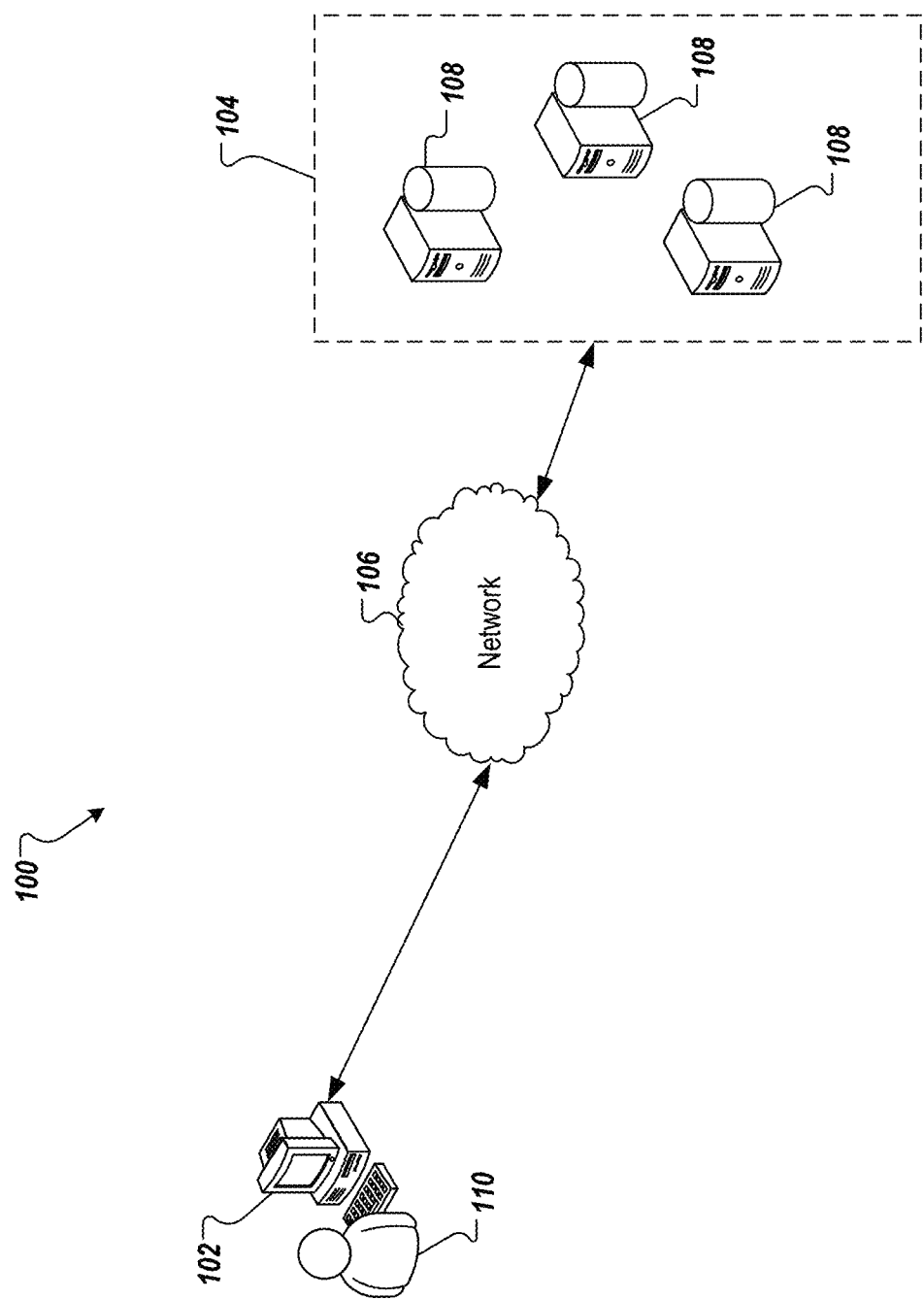
FIG. 1 depicts an example architecture that can be used to execute implementations of the present disclosure.

FIG. 1 depicts an example architecture 100 that can be used to execute implementations of the present disclosure. In the depicted example, the example architecture 100 includes one or more client devices 102, a server system 104 and a network 106. The server system 104 includes one or more server devices 108. In the depicted example, a user 110 interacts with the client device 102. In an example context, the user 110 can include a user, who interacts with an application that is hosted by the server system 104.

In some examples, the client device 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client device 102) over the network 106.

In accordance with implementations of the present disclosure, the server system 104 can host an application (e.g., provided as one or more computer-executable programs executed by one or more computing devices), and one or more database systems. For example, input data can be provided to the server system (e.g., from the client device 102), and the server system can process the input data through the application, which can query the database system to interact with data stored therein.

An example database system includes the in-memory SAP HANA database system provided by SAP SE of Walldorf, Germany. In some examples, a database can be provided as an in-memory database. In some examples, an in-memory database is a database management system that uses main memory for data storage. In some examples, main memory includes random access memory (RAM) that communicates with one or more processors (e.g., central processing units (CPUs)), over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require reduced CPU consumption). In some examples, accessing data in an in-memory database eliminates seek time when querying the data, which provides faster and more predictable performance than disk-storage databases.

As introduced above, multiple systems can be provided, and data can be transported between systems. For example, a database can be populated with content (e.g., data stored in a table) in a first system (e.g., a quality system hosted in the server system 104 of FIG. 1), and can be transported to a second system (e.g., a production system hosted in the server system 104 of FIG. 1). The data can include, for example, configuration data, and/or master data. In some examples, the process of transporting the data is executed by creating a list of table keys, which are read from the first system, and are written to a file for deployment to the second system. In some examples, one or more constraints are defined between tables. An example constraint can include a foreign key constraint (FKC) that is defined between two tables, and is used by applications accessing the data.

However, if a set of records is added to or removed from the second system as a result of the transport, the FKCs defined between tables in the second system can become invalid. For example, a record for a first table (e.g., an item table) can be transported, and the corresponding record for a second table (e.g., header table) can be missing. FKCs can be more complex than this first table and second table example. For example, FKCs can be defined for translated text on UI elements, and/or for relating entities stored in different tables (e.g., material ID, company code).

Approaches have been developed to address this. In one example approach, the FKC is checked in the second system after the import from first system, and violations for the FKC are reported. A user handling the transport then adds records to a subsequent transport to transport the missing items to the second system. This approach has several disadvantages. For example, the second system is not consistent with the first system for some period of time (e.g., until all required transports have been created in the first system, and been transported to the second system). As another example, the check takes time, during which the transport is not yet completed. As another example, for a zero downtime deployment scenario, tables being read by the deployment are set to read-only. Consequently, tables being checked for FKC consistency are read-only during the import (otherwise the check can be invalidated due to changes done to table content during operation). Other example disadvantages include that the re-transport of missing records can create new FKC violations, and the checking/repairing process is a time-consuming, resource inefficient, manual effort.

In view of this, the present disclosure provides implementations that address deficiencies of the above-discussed approach. More particularly, implementations of the present disclosure provide one or more pre-transport checks to ensure FKC consistency between the first system, and the second system. In some implementations, and as described in further detail herein, an add record check is provided, and results in a list of referenced records that are to be added in the second system based on one or more FKCs in the first system. In some implementations, and as described in further detail herein, an add deletion request check is provided, and results in a list of dependent records that are to be deleted in the second system based on one or more FKCs in the first system. As described herein, implementations of the present disclosure work to minimize import time, reduce a number of iterations, be resource efficient, and reduce manual effort.

Figure 2:
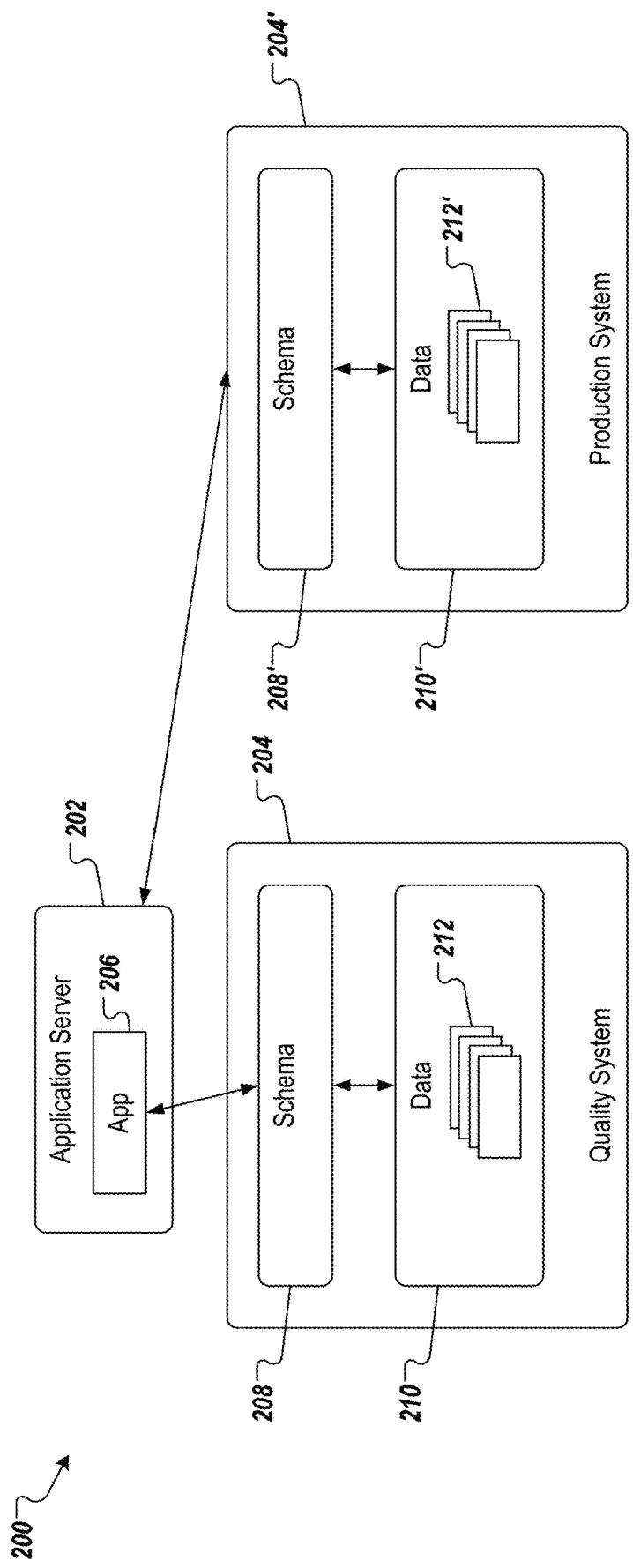
FIG. 2 depicts an example conceptual architecture in accordance with implementations of the present disclosure.

FIG. 2 depicts an example conceptual architecture 200 in accordance with implementations of the present disclosure. In the depicted example, the conceptual architecture includes 200 includes an application server 202, a first database system 204 (e.g., a quality system), and a second database system 204' (e.g., a production system). The application server 202 hosts an application 206 that communicates with one or both of the database system 204, 204' to interact with data 210, 210' respectively stored therein. More particularly, the application 206 communicates with respective schemas 208, 208', which coordinate interactions with the data 210, 210', respectively. For example, the schemas 208, 208' can define one or more views into respective tables 212, 212'.

In this example, data is stored in the tables 212, 212'. Example tables can include column-oriented tables, which store data in columns, each column having a respective data type associated therewith. Each data value stored in a column must be of the data type assigned to the column. Hence, the data type assigned to a column can be considered a constraint. In some examples, multiple tables can be related to each other through a FKC. A FKC can be described as a field (e.g., column) in one table that uniquely identifies a row of another table. Although not depicted in FIG. 2, a computer-implemented deploy tool can deploy (execute) procedures (e.g., maintenance procedures) to the application server 202, and one or both of the database systems 204, 204' including transports. In some implementations, the computer-implemented deploy tool performs one or more actions described herein.

In accordance with implementations of the present disclosure, prior to transport, the FKCs are checked in the export system, such as a quality system (e.g., the database system 204 of FIG. 2). This ensures that a consistent set of table records is deployed to the production system (e.g., the database system 204'), and avoids invalidation of the FKCs in the production system as a result of the transport. In some examples, the quality system, and the production system use the same software version, and the same set of FKCs are defined in the quality system, and the production system.

Figure 3:
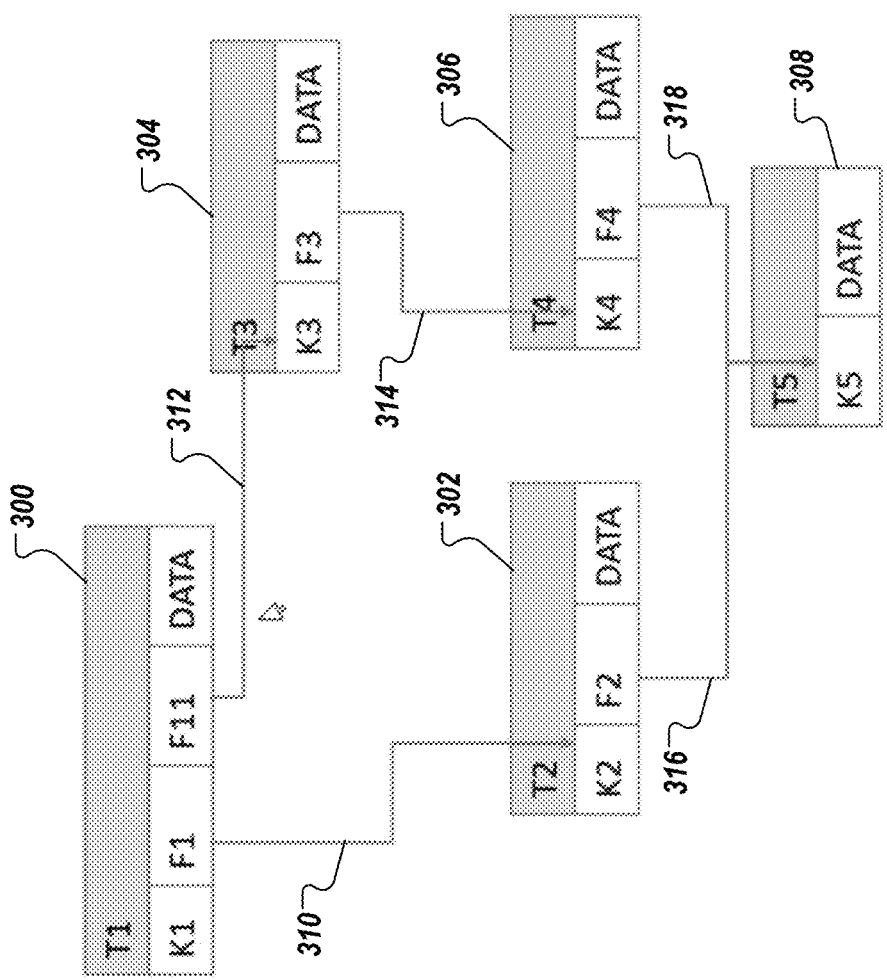
FIG. 3 depict example tables in accordance with implementations of the present disclosure.

FIG. 3 depicts example table relations. In the example of FIG. 3, a table $T_1$ 300, a table $T_2$ 302, a table $T_3$ 304, a table $T_4$ 306, and a table $T_5$ 308 are depicted. A set of FKCs are provided, and includes a FKC 310 between the table $T_1$ 300 and the table $T_2$ 302 (e.g., relating a field (F1) to a key (K2)), a FKC 312 between the table $T_1$ 300 and the table $T_3$ 304 (e.g., relating a field (F11) to a key (K3)), a FKC 314 between the table $T_3$ 304 and the table $T_4$ 306 (e.g., relating a field (F3) to a key (K4)), a FKC 316 between the table $T_2$ 302 and the table $T_5$ 308 (e.g., relating a field (F2) to a key (K5)), and a FKC 318 between the table $T_4$ 306 and the table $T_5$ 308 (e.g., relating a field (F4) to the key (K5)).

For purposes of illustration, a non-limiting, example table relation will be referenced. The example table relation includes the table $T_1$ 302 being a header table ($T_1$=header table), and the table $T_2$ 302 being an item table ($T_2$=item table). As notation, a FKC is depicted as →, which points from the referenced object to the referencing object (e.g., $T_1 \rightarrow T_2$, header→item).

In accordance with implementations of the present disclosure, the FKCs are checked in the export system using an add record process (e.g., an Add-Record-to-next-Export-List process), and an add deletion request process (e.g., Add-Deletion-Request-to-next-Export-List). In some implementations, the add record process selectively includes records in a next transport list for adding in a second system. In some implementations, the add deletion request process selectively includes records in a next transport list for deletion from a second system. The FKCs are checked during each insert of a table to the transport, or after the transport has been assembled and can be released.

Implementations of the present disclosure result in a transport (from the first system to the second system) that complies with FKCs defined for tables. In some examples, the FKCs are defined semantically, and are not enforced on the database infrastructure, alternatively access to a persistency defining FKC for tables. Implementations include reading table content (e.g., records), and assessing the table content with respect to a defined FKC. In some examples, one or more records that are missing, and needed to satisfy an FKC are identified. In some examples, it is determined whether a record has already been deployed to the second system. For example, data stored in a deployment store can be referenced to determine whether a particular record has been deployed from a vendor component. As another example, data stored in a table content export store can be reference to determine whether a particular record has been exported to the second system during a previous transport. In some examples, a record is added as data to a next export list store, indicating that the record is to be transported during the next transport to the second system.

In some implementations, and as described in further detail herein, a process is iterated for each record in a set of records. For each record, the record is stored in the next export list store, and it is determined whether the table that the record is stored in has on or more FKCs. If so, for each FKC, the referred table is read to identify the record that satisfies the FKC. In some implementations, the table content export store, and/or the next export list store are read to determine whether the identified record is included therein. If the record is included in at least one of the table content export store, and the next export list store, the process iterates to the next FKC (e.g., if another FKC exists for the table being considered), or to the next record (e.g., if all FKCs or the table being considered have been processed, and there is at least one additional record to process). In some implementations, if the record is not included, the record is added to next export list store to be transported to the second system. The process iterates to the next FKC (e.g., if another FKC exists for the table being considered), or to the next record (e.g., if all FKCs or the table being considered have been processed, and there is at least one additional record to process). In some examples, the process, if, for each record in the set of records, all referred records are included in the table content export store, or the next export list store.

In some implementations, the transport is performed to transport records to the second system from the first system. In some examples, table names and keys are read from the next export list store, records from the defined tables matching the keys are identified, and are stored in a file. Content (records) from the file are deployed to the second system. In some examples, deployment can include reading table name and key(s), and writing data (e.g., insert, update, delete) from the file to the respective table in the second system.

Implementations of the present discosure are described in further detail with reference to example scenarios, and an example FKC between tables T1 and $T_2$ described above. It is contemplated that implementations of the present disclosure are not limited to the examples described herein.

In a first example scenario, a quality system and a production system are consistent, but a change is to be deployed to the production system. Implementations of the present disclosure are used to ensure that the production system remains consistent after the change. That is, a consistent change is to be made to the production system. For adding a record, the transport includes a to-be-added record, and any other records that also need to be added to the production system to ensure any FKCs remain valid. For deleting a record, the transport includes the to-be-deleted record, and any other records requiring the to-be-deleted record to ensure the FKCs remain valid.

In a second example scenario, the production system is not consistent with the quality system, and a change is provided in the transport to be deployed to the production system, so the production system becomes consistent. In some examples, one or more records in the quality system may be missing from the production system resulting in the inconsistency. In some examples, the missing records are identified, and are included in respective add record actions in the transport. For example, and continuing with the example above, for (header→item): $T_1 \to T_2$, an entry in $T_1$ is missing in the production system. In some examples, a set of records in the quality system, which is required to be deployed to the production system to add the missing record is determined, and includes any additional records that also need to be deployed to ensure that all FKCs are met.

In some examples, instead of adding the record(s) in the production system one or more records can be deleted from the production system. That is, the transport can include one or more record deletions to delete respective records from the production system. For example, and continuing with the example above, for (header 4 item): $T_1 \to T_2$, a record in $T_2$ is absent from $T_1$. In some implementations, a set of records in the quality system is determined, and includes records required to be deleted in the production system to ensure all FKCs are met.

This is illustrated with reference to the non-limiting example of:

$T_1$=header, and
$T_2$=item, where
$T_1 \to T_2$, header 4 item

In this example, an FKC is depicted as → to point from the referenced object to the referencing object (e.g., referencing: $T_2$, referenced: $T_1$).

Using this example, an example addition of a record can include adding a record to $T_2$. To do this, the referenced object ($T_1$) is read, and it is determined that the respective record is missing. In response, an add record to deletion list request is provided in the transport. In some examples, for adding an item record to the deletion list, the header table and a header record in the header table are identified, the header record matching the item record. If the header record is missing on the deletion request, it is added as an deletion request in the transport. In some examples, for deleting a record from a table (e.g., $T_1$), the referencing object is identified (e.g., $T_2$), and it is determined whether the record exists in the referencing object. If the record exists, the record is deleted from the referencing object. For example, for adding an header record deletion request, the item table is identified, and is read to determine whether the corresponding item record(s) is/are included, and if so, are added as respective deletion requests.

Figure 4:
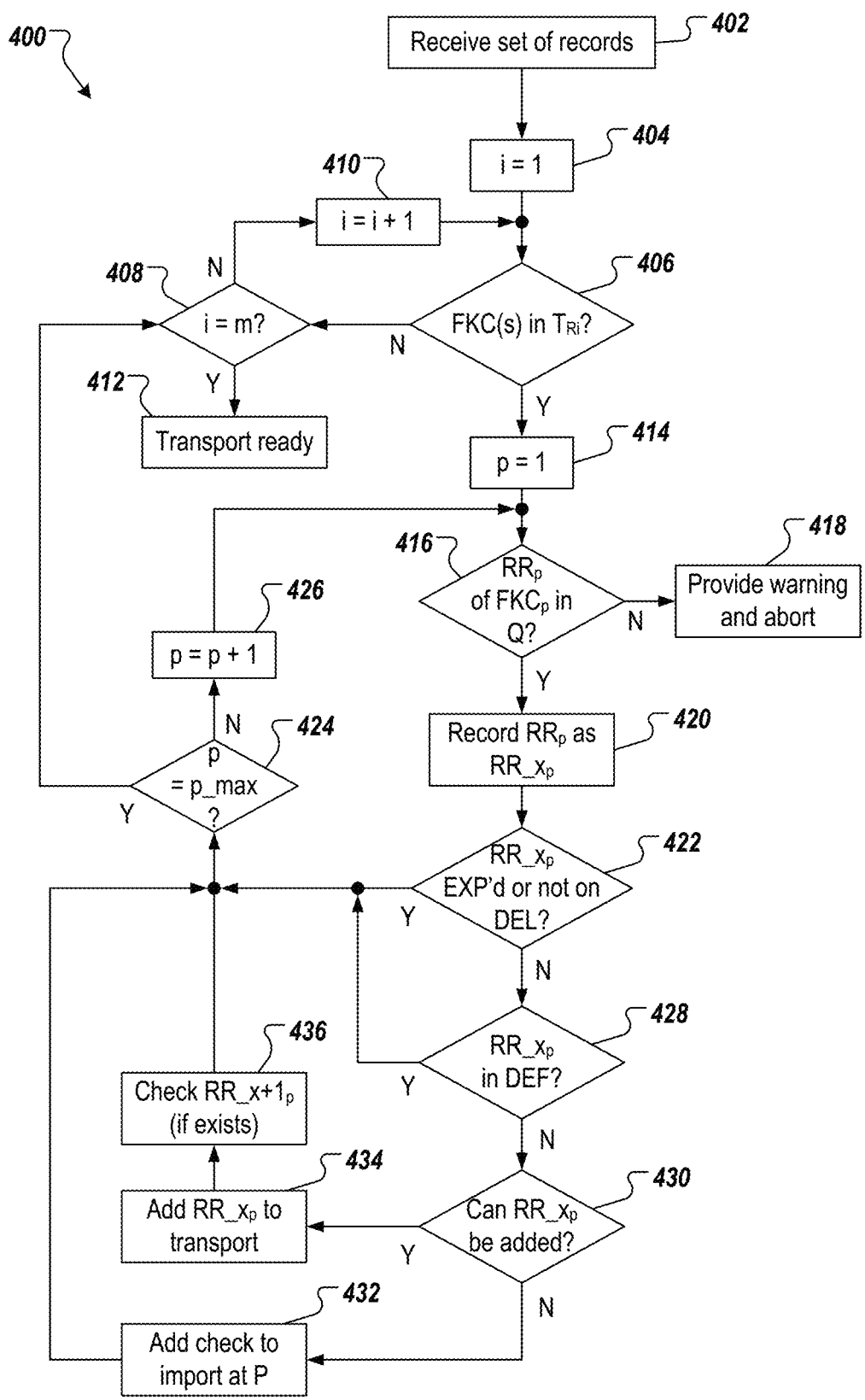
FIG. 4 depicts an example process that can be executed in accordance with implementations of the present disclosure.

FIG. 4 depicts an example add record process 400 that can be executed in accordance with implementations of the present disclosure. In some examples, the example process 400 can be provided by one or more computer-executable programs executed using one or more computing devices. The example process 400 depicts an example add record check between a first system, and a second system. For purposes of non-limiting illustration, the first system is provided as a quality system (Q), and the second system is provided as a production system (P). In some implementations, for every record included in a list of records that are to be transported to the production system, it is determined whether the table storing the respective records has one or more defined FKCs. If so, a check is performed, as described herein, to ensure consistency between the quality system and the production system.

In the example of FIG. 4, a set of records is received (402). For example, a deployment tool receives table names, and a list of keys to be added to the production system, and the set of records is provided therefrom (e.g., records corresponding to the keys). In some examples, the set of records includes one or more records (e.g., $R_1, \ldots, R_m$) stored in one or more tables (e.g., record being stored in a respective table). A counter i is set equal to 1 (404). It is determined whether at least one FKC is included for a table $T_{Ri}$ (406). The table $T_{Ri}$ is the table that stores the record $R_i$ of the current iteration.

By way of a first example, and referring to FIG. 3, it can be determined that the record $R_i$ is included in $T_3$ 304, which includes the FKC 314 to $T_4$ 306 (e.g., $T_3 \to T_4$). By way of a second example, and referring to FIG. 3, it can be determined that the record $R_i$ is included in $T_5$ 308, which includes no FKCs (e.g., no records in $T_5$ are referenced).

If no FKC is included for table $T_{Ri}$, it is determined whether the counter i is equal to m (408). That is, it is determined whether all records in the list of records have been considered. If the counter i is equal to m, the check is complete, and the transport is ready (412). If the counter i is not equal to m, the counter i is incremented (410), and the example process 400 loops back. If at least one FKC is included for table $T_i$ (e.g., $FKC_1, \ldots FKC_n$), a counter p is set equal to 1 (414).

It is determined whether a record ($RR_p$) that is referenced by the $FKC_p$ exists in the quality system (416). For example, a look-up can be performed in the quality system to determine whether $RR_p$ exists there. For example, and referring to FIG. 3, it can be determined whether the $RR_p$ in $T_4$ referenced by the FKC 314 exists in the quality system. If $RR_p$ does not exist in the quality system, a warning is provided and the add record process is aborted (418). That is, if $RR_p$ does not exist in the quality system, transport of $RR_p$ to the production system would result in inconsistencies between the systems. In some examples, in response to the warning, a correction can be made (e.g., remove $R_i$ from the transport, add $RR_p$ to the quality system), and the example process 400 can be re-run for the updated transport. If $RR_p$ does exist in the quality system, $RR_p$ is denoted as a referred record of level x ($RR\_x_p$) (420).

It is determined whether $RR\_x_p$ was previously exported (e.g., had already been transported to the production system, or is not listed as delete on the currently created transport (422). If it is determined that $RR\_x_p$ either had been previously exported, or is not listed as delete on the currently created transport, the transport of $RR\_x_p$ will not invalidate the $FKC_p$, and it is determined whether the counter p is equal to p_max (424). That is, it is determined whether all FKCs for the table $T_i$ have been checked. If the counter p is not equal to p_max, the counter p is incremented (426), and the example process loops back to check the record for the next FKC. If the counter p is equal to p_max, the example process 400 loops back to check whether any additional tables are to be reviewed.

If it is determined that $RR\_x_p$ either had not been previously exported, or is listed as delete on the currently created transport, it is determined whether $RR\_x_p$ is included as vendor default content (DEF) (428). If $RR\_x_p$ is included as DEF, $RR\_x_p$ is already included in the production system and will not invalidate the $FKC_p$, and the example process 400 loops back to check whether records for any additional FKC(s) need be reviewed. If $RR\_x_p$ is not included as DEF, it can be determined whether to $RR\_x_p$ can be added to the transport (430). If it is determined that $RR\_x_p$ cannot be added (e.g., it relates content that is not shipped (default) or transported, but is created at runtime), a check can be added to the production system for checking at the import process 432.

In some implementations, upon import of the transport $T_x$ to the production system, the list of objects and the respective action (e.g., insert or delete or "required") are first written to the production system. However, the respective actions are not yet executed. A module is called in the production system to check the impact the transport will have on the production system. In some examples, the module read the objects of the transport content, which are to be written to the production system. The module checks whether the records, which are "required" are available in the production system, and if not a message is displayed that an entry "required" is missing and is to be created in the production system. The module also checks whether the records that are to be deleted are referenced by records in the production system. If this is the case, a message is displayed, to either delete the referencing records as well or stop the deployment. If the check passes, the transport is imported. In some examples, when the checks are performed before releasing the transport to the production system, these entries may be transferred inactively using a direct system connection. The checks are then performed to get the result earlier in the test system.

If $RR\_x_p$ can be added to the transport, $RR\_x_p$ is added to the transport (434). In some examples, a user can be prompted to add $RR\_x_p$ (e.g., a user interface is displayed recommending that $RR\_x_p$ be manually added to the transport). In some examples, $RR\_x_p$ can be automatically added to the transport (increasing the set of records on the transport). The Record $RR\_x_p$ is then checked for FKC(s) as an additional entry of the transport.

Figure 5:
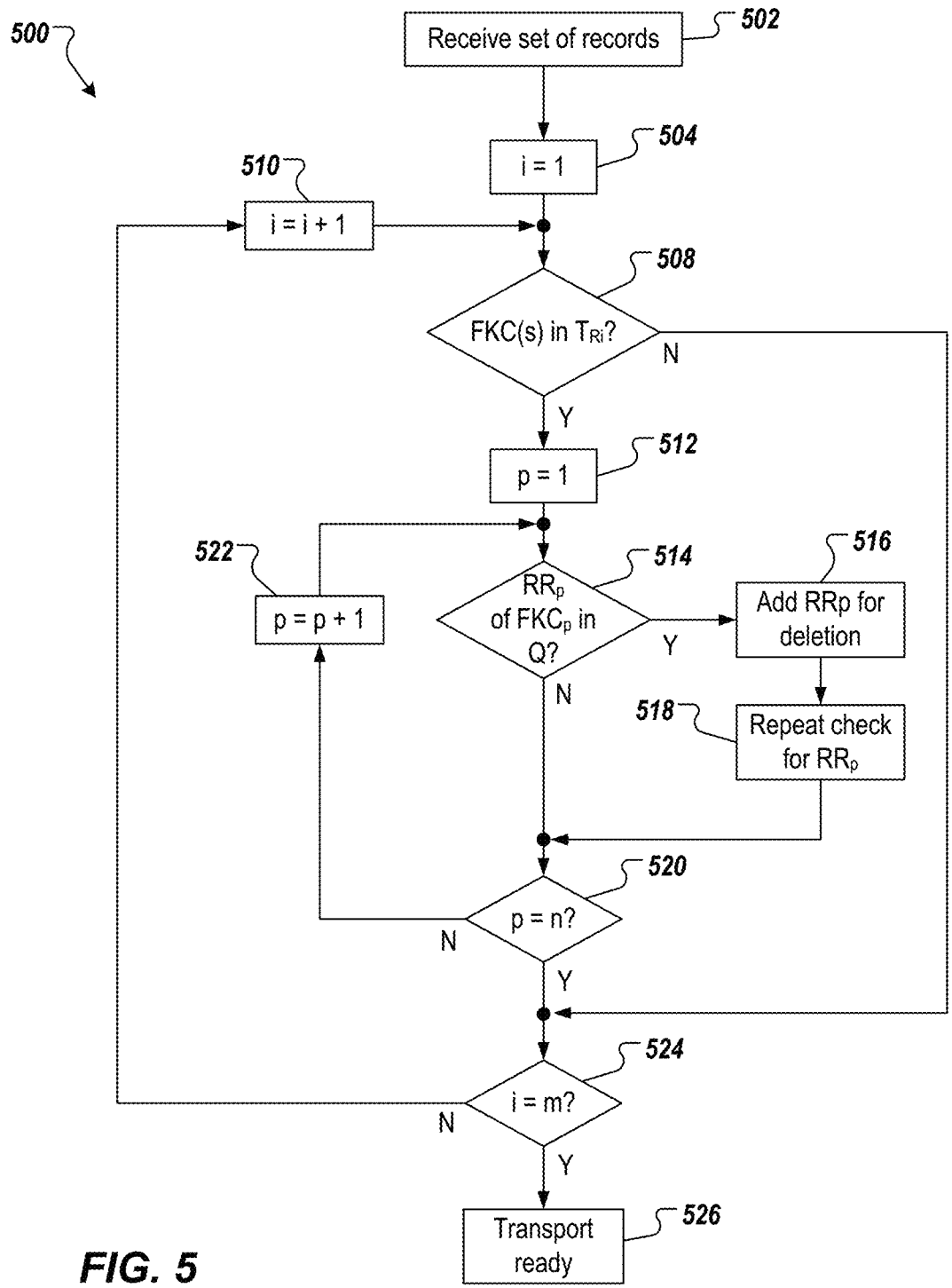
FIG. 5 depicts an example process that can be executed in accordance with implementations of the present disclosure.

FIG. 5 depicts an example add deletion request process 500 that can be executed in accordance with implementations of the present disclosure. In some examples, the example process 500 can be provided by one or more computer-executable programs executed using one or more computing devices. The example process 500 depicts an example add deletion request check between a first system, and a second system. For purposes of non-limiting illustration, the first system is provided as a quality system (Q), and the second system is provided as a production system (P). In some examples, the example process 500 is executed prior to deleting records in the quality system.

In the example of FIG. 5, a set of records is received (502). For example, a deployment tool receives table names, and a list of keys to be deleted from the production system, and the set of records is provided therefrom (e.g., records corresponding to the keys). In some examples, the set of records includes one or more records (e.g., $R_1, \ldots, R_m$) stored in one or more tables (e.g., record being stored in a respective table). A counter i is set equal to 1 (504). It is determined whether at least one FKC is associated with $R_i$ (506). That is, it is determined whether another record references $R_i$. If no FKC is associated with $R_i$, it is determined whether the counter i is equal to m (524). That is, it is determined whether all records in the list of records have been considered. If the counter i is equal to m, the check is complete, and the transport is ready (526). If the counter i is not equal to m, the counter i is incremented (510), and the example process 500 loops back.

If at least one FKC is associated with a counter p is set equal to 1 (512). It is determined whether a record ($RR_p$) that is referenced by the $FKC_p$ exists in the quality system (514). For example, a look-up can be performed in the quality system to determine whether $RR_p$ exists there. If $RR_p$ does not exist in the quality system, it is determined whether the counter p is equal to n (520). That is, it is determined whether all FKCs for $R_i$ have been checked. If the counter p is not equal to n, the counter p is incremented (522), and the example process 500 loops back to check the record for the next FKC. If the counter p is equal to n, the example process 500 loops back to check whether any additional records are to be reviewed. If $RR_p$ does exist in the quality system, $RR_p$ is added to the transport for deletion (516), and the same check is performed for $RR_p$ (518). That is, it is determined whether there are any dependent records from $RR_p$, and if they are in the quality system, they are added for deletion. In this manner, a string of dependent records having $R_i$ as the root can be identified for deletion.

After the transport is ready, the records can be deleted in the quality system. In some examples, in processing the deletions in the production system, dependencies for each to-be-deleted record are again checked. That is, for example, dependencies could exist in the production system that did not exist in the quality system when the check was performed in the quality system (e.g., when the example process 500 was executed). This can occur, for example, when the quality system and the production system are inconsistent at the outset. If there are any records corresponding to such dependencies, an error message can be provided (e.g., the deletion process stops in the production system, and a user (admin) is alerted).

Figure 6:
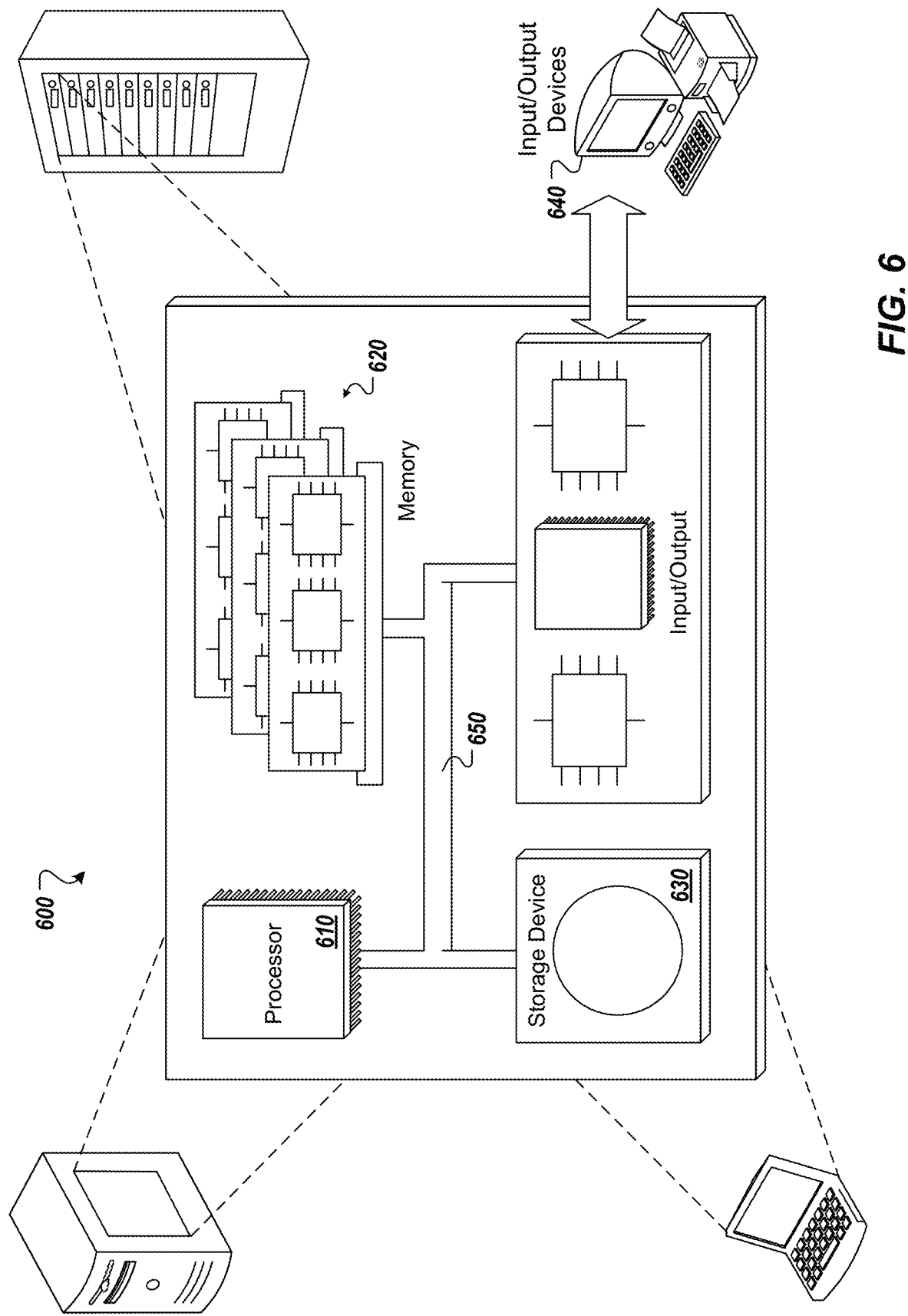
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for transports between a first database system and a second database system, the method being executed by one or more processors and comprising:
    prior to executing a transport between the first database system storing a first version of data and executing a version of software, and the second database system storing a second version of the data and executing the version of software, receiving a set of records, and, for a first record in the set of records:
        identifying a first table of the first database system that the first record is stored in, and
        determining that the first table is associated with a set of foreign key constraints (FKCs), and, for each FKC:
            determining that a referenced record exists in a second table within the first database system based on the FKC, the FKC relating the first record in the first table to the referenced record in a second table within the first database system, and
            selectively adding the referenced record originally stored in the second table within the first database system to a list of the transport to maintain validity of the FKC within the second database system after execution of the transport; and
    providing the transport comprising the list, the transport being executable in the second database system to one or more of add records and delete records from the second version of the data, while maintaining validity of one or more FKCs already included in the second version of the data in the second database system.

2. The method of claim 1, wherein the referenced record is to be added to the second database system as a result of the transport.

3. The method of claim 2, wherein selectively adding the referenced record to the list at least partially comprises determining that referenced record is included in the first database system, and that the referenced record has not been previously exported to the second database system, and is not listed for deletion on the transport being assembled.

4. The method of claim 2, wherein selectively adding the referenced record to the list at least partially comprises determining that the referenced record is not provided as default content.

5. The method of claim 1, wherein the referenced record is to be deleted from the second database system as a result of the transport.

6. The method of claim 5, wherein selectively adding the referenced record to the list at least partially comprises determining that referenced record is included in the first database system.

7. The method of claim 5, further comprising adding a second referenced record to the list, the second referenced record being referenced by the referenced record through a second FKC.

8. A non-transitory computer-readable storage medium coupled to one or more processors and having instructions stored thereon which, when executed by the one or more processors, cause the one or more processors to perform operations for transports between a first database system and a second database system, the operations comprising:
prior to executing a transport between the first database system storing a first version of data, and the second database system storing a second version of the data, receiving a set of records, and, for a first record in the set of records:
identifying a first table of the first database system that the first record is stored in, and
determining that the first table is associated with a set of foreign key constraints (FKCs), and, for each FKC:
determining that a referenced record exists in a second table within the first database system based on the FKC, the FKC relating the first record in the first table to the referenced record in the second table within the first database system, and
selectively adding the referenced record originally stored in the second table within the first database system to a list of the transport to maintain validity of the FKC within the second database system after execution of the transport; and
providing the transport comprising the list, the transport being executable in the second database system to one or more of add records and delete records from the second version of the data, while maintaining validity of one or more FKCs already included in the second version of the data in the second database system.

9. The non-transitory computer-readable storage medium of claim 8, wherein the referenced record is to be added to the second database system as a result of the transport.

10. The non-transitory computer-readable storage medium of claim 9, wherein selectively adding the referenced record to the list at least partially comprises determining that referenced record is included in the first database system, and that the referenced record has not been previously exported to the second database system, and is not listed for deletion on the transport being assembled.

11. The non-transitory computer-readable storage medium of claim 9, wherein selectively adding the referenced record to the list at least partially comprises determining that the referenced record is not provided as default content.

12. The non-transitory computer-readable storage medium of claim 8, wherein the referenced record is to be deleted from the second database system as a result of the transport.

13. The non-transitory computer-readable storage medium of claim 12, wherein selectively adding the referenced record to the list at least partially comprises determining that referenced record is included in the first database system.

14. The non-transitory computer-readable storage medium of claim 12, wherein operations further comprise adding a second referenced record to the list, the second referenced record being referenced by the referenced record through a second FKC.

15. A system, comprising:
a computing device; and
a computer-readable storage device coupled to the computing device and having instructions stored thereon which, when executed by the computing device, cause the computing device to perform operations for transports between a first database system and a second database system, the operations comprising:
prior to executing a transport between the first database system storing a first version of data, and the second database system storing a second version of the data, receiving a set of records, and, for a first record in the set of records:
identifying a first table of the first database system that the first record is stored in, and
determining that the first table is associated with a set of foreign key constraints (FKCs), and, for each FKC:
determining that a referenced record exists in a second table within the first database system based on the FKC, the FKC relating the first record in the first table to the referenced record in a second table within the first database system, and
selectively adding the referenced record originally stored in the second table within the first database system to a list of the transport to maintain validity of the FKC within the second database system after execution of the transport; and
providing the transport comprising the list, the transport being executable in the second database system to one or more of add records and delete records from the second version of the data, while maintaining validity of one or more FKCs already included in the second version of the data in the second database system.

16. The system of claim 15, wherein the referenced record is to be added to the second database system as a result of the transport.

17. The system of claim 16, wherein selectively adding the referenced record to the list at least partially comprises determining that referenced record is included in the first database system, and that the referenced record has not been previously exported to the second database system, and is not listed for deletion on the transport being assembled.

18. The system of claim 17, wherein selectively adding the referenced record to the list at least partially comprises determining that the referenced record is not provided as default content.

19. The system of claim 15, wherein the referenced record is to be deleted from the second database system as a result of the transport.

20. The system of claim 19, wherein selectively adding the referenced record to the list at least partially comprises determining that referenced record is included in the first database system.

* * * * *